United States Patent [19]

Tatami

[11] 4,251,830
[45] Feb. 17, 1981

[54] SYSTEM FOR REMOVING VERTICAL VIBRATIONS FROM REPRODUCED VIDEO

[75] Inventor: Mitsushige Tatami, Ebina, Japan

[73] Assignee: Sony Corporation, Tokyo, Japan

[21] Appl. No.: 28,597

[22] Filed: Apr. 9, 1979

[30] Foreign Application Priority Data

Apr. 7, 1978 [JP] Japan .................................. 53-41421
May 25, 1978 [JP] Japan .................................. 53-62700

[51] Int. Cl.³ .......................... H04N 5/76; H04N 5/78
[52] U.S. Cl. ............................................ 358/8; 360/10
[58] Field of Search ................... 358/4, 8, 31, 140; 360/8-11, 13, 14, 33-37

[56] References Cited

U.S. PATENT DOCUMENTS

| | | | |
|---|---|---|---|
| 3,761,604 | 9/1973 | Ozawa et al. | 358/4 |
| 3,886,589 | 5/1975 | Nasu | 360/11 |
| 3,890,638 | 6/1975 | Bargen | 358/8 |
| 3,934,262 | 1/1976 | Snopko | 358/4 |
| 3,969,759 | 7/1976 | Amery | 358/31 X |
| 4,021,852 | 5/1977 | Hurst et al. | 360/38 |
| 4,055,848 | 10/1977 | Fearnside | 358/4 X |
| 4,057,835 | 11/1977 | Kinuhata et al. | 358/140 |
| 4,093,959 | 6/1978 | Hedlund | 358/4 |

Primary Examiner—Terrell W. Fears
Assistant Examiner—Aristotelis M. Psitos
Attorney, Agent, or Firm—Lewis H. Eslinger; Alvin Sinderbrand

[57] ABSTRACT

In a television reproduction system in which recorded video for one field, either odd or even, is repeatedly scanned, such as for still or slow motion reproduction, and is displayed with a locally generated synchronizing signal which produces interlaced scanning having both odd and even fields on a television screen, video from adjacent lines is averaged when the recorded field being scanned is an odd or even field and the field defined by the synchronizing signal is the opposite type. When the recorded video is a color video signal, the luminance and chrominance components of the video signal are separately averaged, the chrominance component is inverted in dependence on the relationship between the phase of the color subcarrier of the recorded line being reproduced and the phase of the color subcarrier of the locally generated synchronizing signal.

28 Claims, 22 Drawing Figures

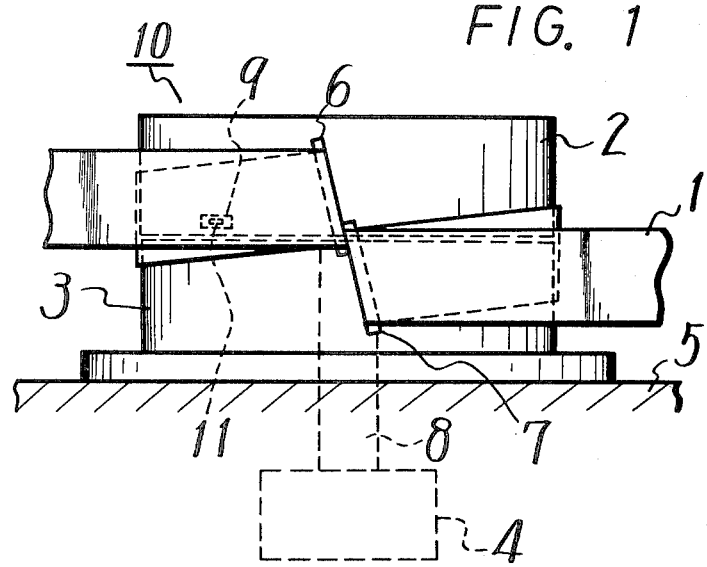
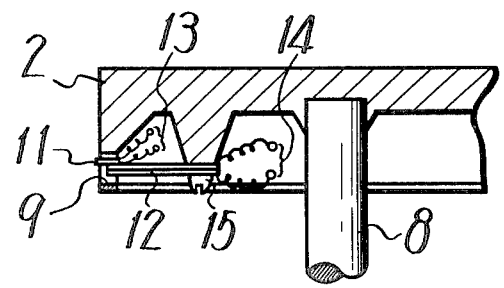
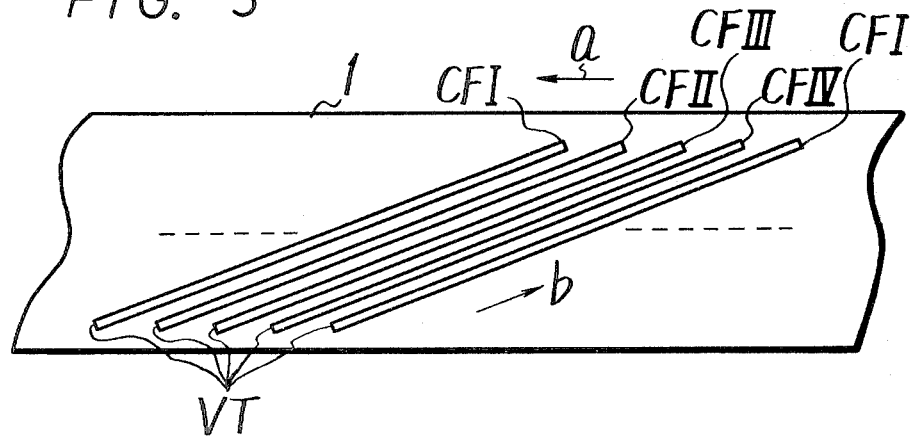

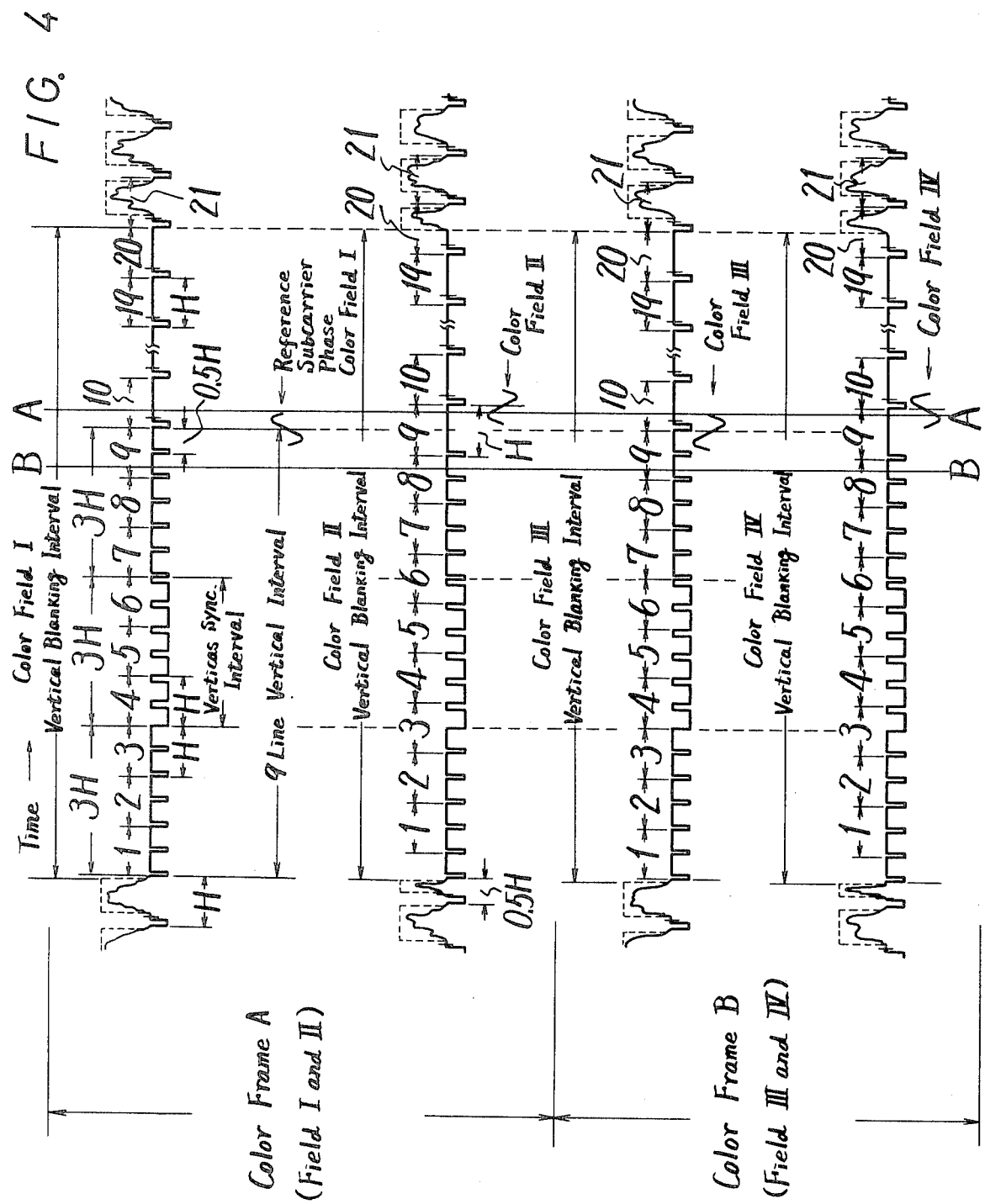

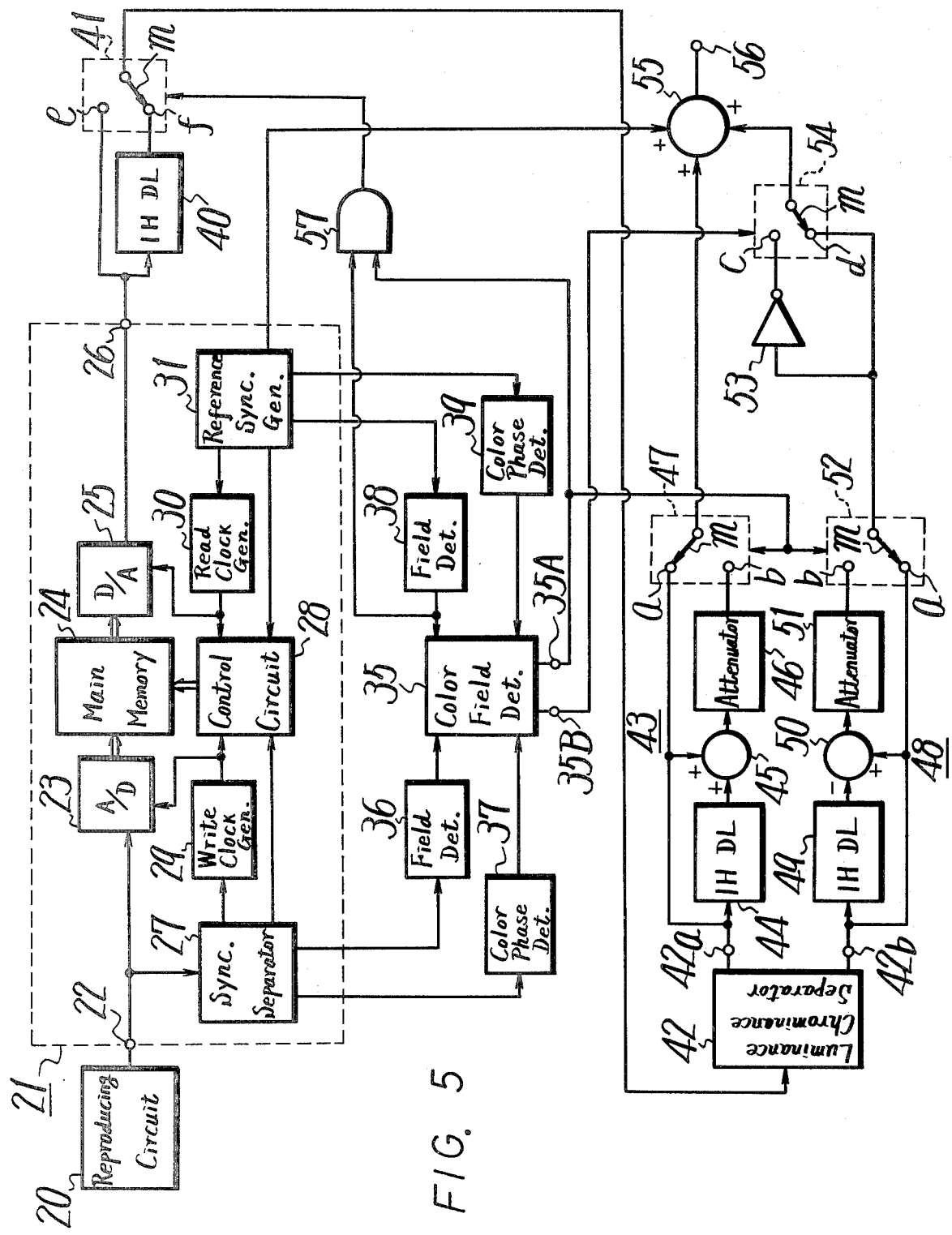
F I G. 5

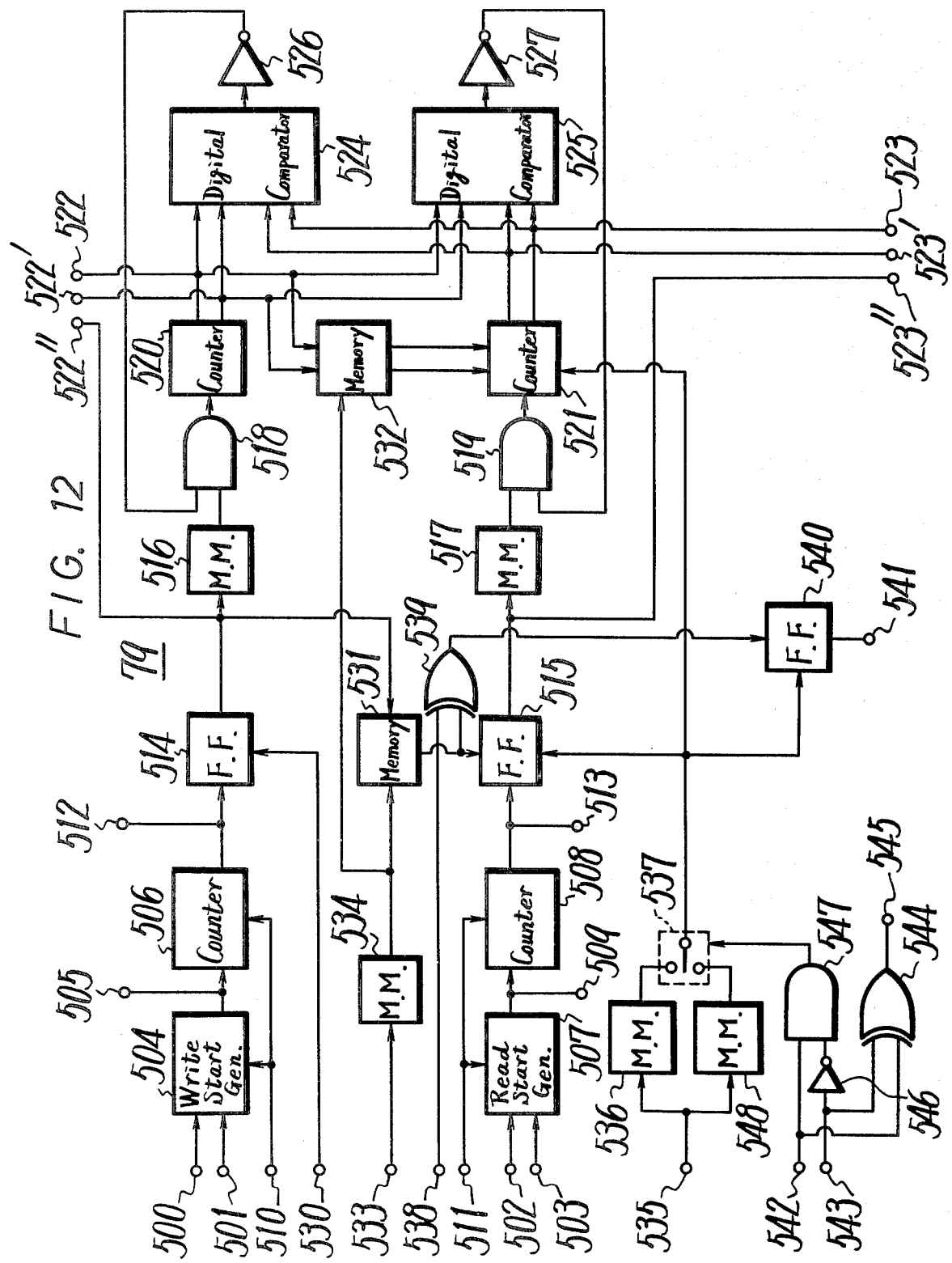

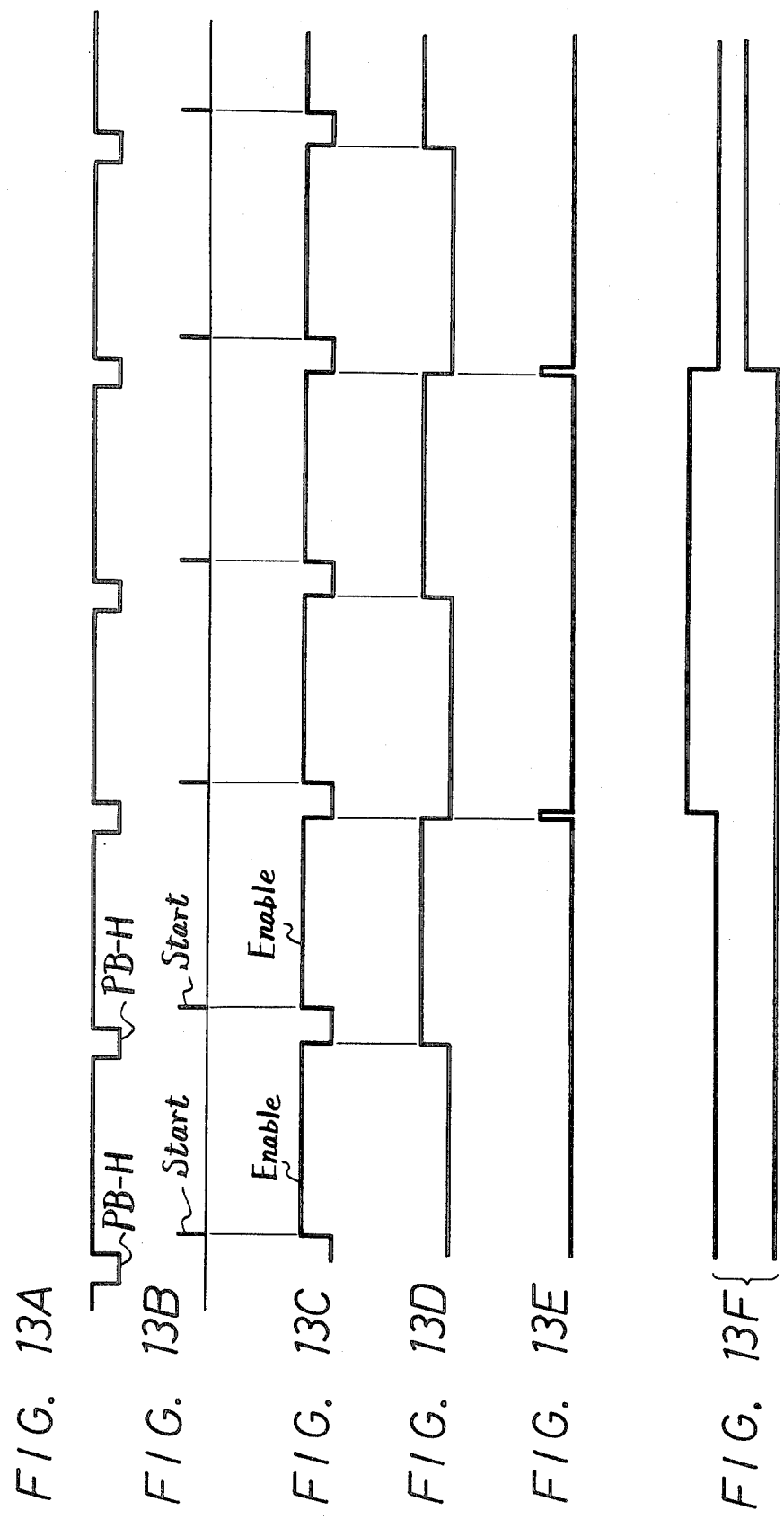

SYSTEM FOR REMOVING VERTICAL VIBRATIONS FROM REPRODUCED VIDEO

BACKGROUND OF THE INVENTION

This invention generally relates to a reproducing system for a video signal reproducing apparatus, and particularly to a system in which vertical vibrations of a reproduced image on a television screen are avoided during slow or still reproduction.

A well known commercial television system uses an interlaced scanning system consisting of repeating frames having a first, or odd, field which reproduces alternate lines of each frame and a second, or even, field interlaced with the first field, which reproduces the remaining lines of each frame. The odd field consists of parallel television lines, the first of which begins in the upper left corner of the television screen and the last of which ends in the middle of the bottom of the screen. The even field consists of parallel television lines interlaced between the lines of the odd field, the first of which begins in the middle of the top of the television screen and the last of which ends at the lower right corner of the television screen. The video at a point in a line from an even field, for example, contains video data which reproduces a part of the picture occurring just above or just below a corresponding point on the next adjacent line from the odd field. The vertical distance between such corresponding points is one half pitch, or one half the center to center distance between adjacent field lines (which is equal to the vertical center to center distance between adjacent interlaced lines).

When video signals of the same field are repeatedly reproduced by a video tape, video sheet or video disc reproducing device, direct use cannot be made of the reproduced synchronizing signal since this signal lacks the necessary relationship between vertical and horizontal synchronizing pulses for producing interlaced scanning. A locally generated synchronizing signal having the necessary relationships between horizontal and vertical synchronizing signals is normally produced in the reproducing apparatus and substituted during reproduction for the corresponding recorded signals. However, the use of locally generated synchronizing signals may result in the video signal being displayed in one field on the television screen and then the same video signal being again displayed but shifted up or down by an amount corresponding to one half a pitch. Accordingly, the reproduced picture appears to vibrate annoyingly up and down on the screen even though the interlaced raster is stationary.

The shifting process described above occurs when processing a composite color television signal, but an additional problem arises from the fact that the phase of a chrominance component in the composite color television signal in the NTSC system has a specific and changing relationship from line to line, field to field, and frame to frame. Specifically, the phase of the color subcarrier is reversed from line to line and from field to field. The locally generated synchronizing signal may contain a color burst signal having the correct changing phase relationship to frames and fields to correctly demodulate a color signal. When repetitively scanning the same field line, however, the phase of the reproduced chrominance signal may not be in the relationship required by the NTSC system, and a correct color image cannot be reproduced. The above requirement as to the changing relationship of phase is especially important when generating a composite color television signal for broadcasting.

OBJECTS AND SUMMARY OF THE INVENTION

An object of this invention is to provide a novel video signal reproducing system.

Another object of this invention is to provide a new signal processing system for a reproducing apparatus which permits reproducing modes such as slow, still and reverse without vertical shift of the video from field to field.

Another object of this invention is to provide a video reproducing system for interlaced scanning.

Another object of this invention is to provide a video reproducing system which may be used to reproduce a video signal from a video sheet, video disk or helically scanned video tape.

Another object of this invention is to provide a video reproducing system which may be used with a reproducing system having a time base corrector.

According to this invention, when a video signal of one field is displayed using a synchronizing signal of another field, video signals of two adjacent field lines are averaged to remove a visual time base shift.

During still reproduction, a picture on the screen is prevented from vibrating upward or downward by one half the pitch of field lines from field to field by averaging video from adjacent lines in alternate fields to effectively retard or advance the video by one half the pitch of field lines and shift the video in these alternate fields into the same vertical position as the video in the non-averaged fields. Averaging is performed using a delay line having a 1 H delay (where H is a horizontal interval) which permits shifting the video upward by adding video of the n−1 th video line with video from the n th video line or shifting the video downward by adding video of the n th video line with the video of the n+1 th video line. A 1 H delay line permits selectively retarding or advancing the summed video in order to permit a relative upward or downward video shift.

Conveniently, modern time base correctors contain memories which can store at least several lines of video signal. The existence of such memories permits adjacent line averaging as required in this invention and thus makes this invention especially applicable in such systems.

In a composite NTSC color video signal, color phase is inverted from line to line. In order to average the chrominance component of adjacent lines, subtraction rather than addition is required to shift the chrominance signal by one half pitch. Averaging is performed by separating the chrominance and luminance components, summing the luminance components of adjacent field lines, subtracting the chrominance video component of adjacent field lines and then recombining the averaged luminance and chrominance components. In order to accommodate the changing color phase relationship from field to field, the averaged or unaveraged chrominance component is selectively inverted before being recombined with the averaged or unaveraged luminance component.

According to an aspect of the invention, there is provided a video signal processing system for processing a reproduced video signal having at least one type of television field containing television lines, the at least one type of television field being one of an odd field and an even field which comprises reference synchronizing signal generating means for generating a reference synchronizing signal operative to define a plurality of types of reference television fields in a predetermined repeating order, means for detecting non-coincidence between a characteristic of the at least one type of reproduced television field and one of the plurality of types of reference television fields and for producing a signal in response thereto, means for mixing reproduced video signals of an adjacent two of the television lines to produce an interpolated signal, and selective means for selectively producing output video signals containing only one of the reproduced video signal and the interpolated video signal in response to the signal from the means for detecting.

The above, and other objects, features and advantages of the present invention will become apparent from the following description read in conjunction with the accompanying drawings.

BRIEF DESCRIPTION OF THE DRAWINGS

FIG. 1 is a schematic side view of part of a Q-wrap-type helical video tape recorder for reproducing a video signal to which reference will be made in describing an embodiment of the present invention;

FIG. 2 is a fractional sectional view showing an upper rotary tape guide drum of the helical video tape recorder of FIG. 1;

FIG. 3 is a plan view of a portion of a strip of video tape with skewed parallel tracks of a recorded pattern represented thereon as produced by a helical video tape recorder of FIG. 1;

FIG. 4 is a set of four graphs to which reference will be made in explaining four color fields I, II, III and IV in an NTSC television system;

FIG. 5 is a block diagram showing a video processing system according to an embodiment of the present invention;

FIG. 12 is a detailed block diagram of a control circuit for controlling the operation of the time base corrector of FIGS. 5 and 6; and FIGS. 13A to 13F are waveform diagrams of control signals produced by the control circuit shown in FIG. 12.

DETAILED DESCRIPTION OF THE PREFERRED EMBODIMENT

Figure 6:
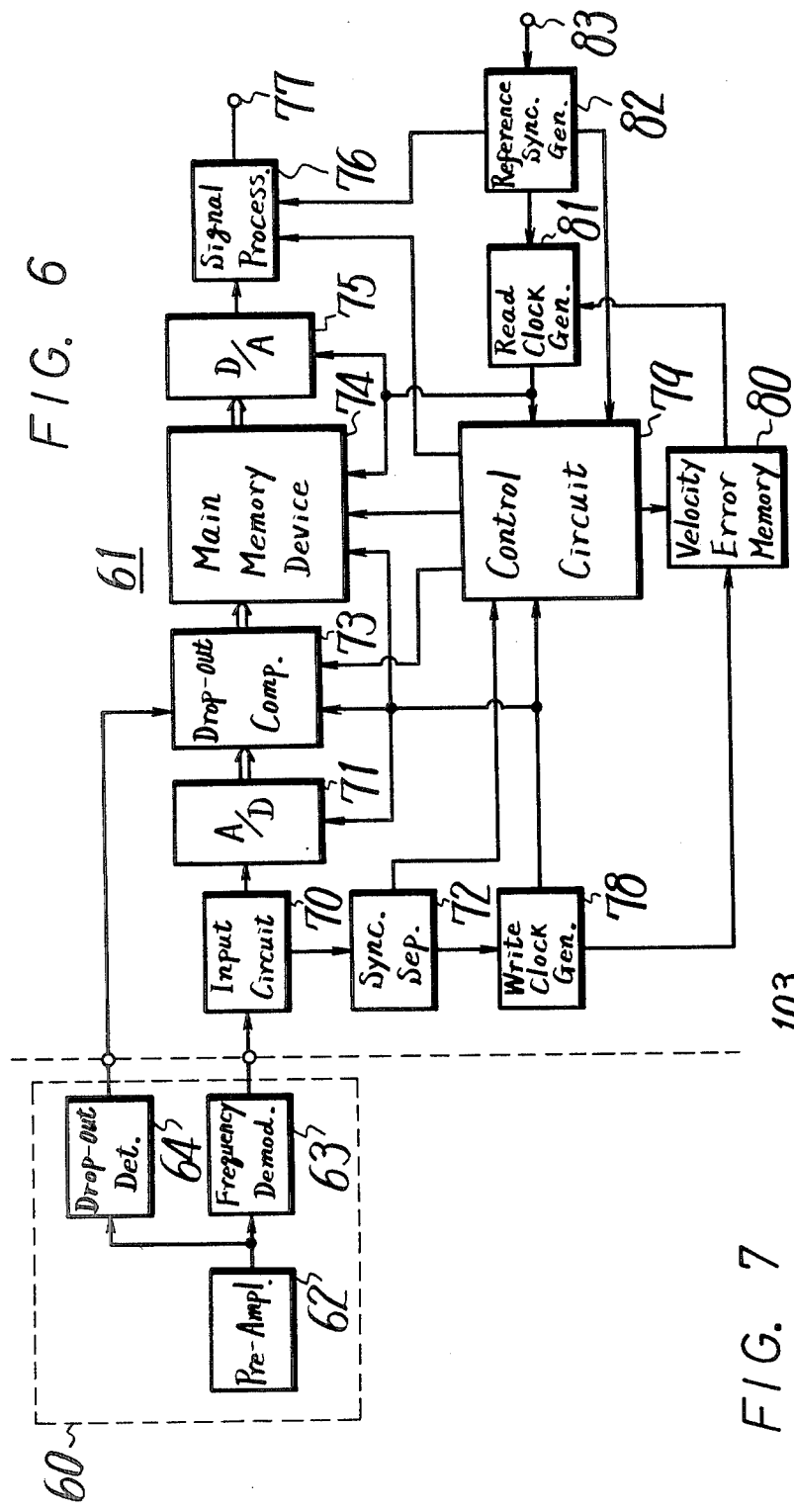
FIG. 6 is a block diagram showing portions of a video processing system according to a second embodiment of the present invention including a more detailed time base corrector and reproducing circuit.

In addition to the normal mode of reproducing a recorded video signal at a speed equal to the recording speed, special effect reproducing modes, such as still, slow, fast or reverse can be achieved by video sheet, video disc or helical scan video tape reproducing apparatus. For purposes of description only, and not as a limitation, an embodiment of the present invention is described with reference to an example using a helical video tape reproducing apparatus which can achieve a guard band noiseless special effect reproducing mode using a rotary head positioning device.

Referring to FIG. 1, there is shown part of a conventional helical video tape recorder/reproducer of the Q-wrap-type, in which a video tape 1 is wound approximately 360 degrees about the perimeter of a tape guide drum 10. Tape guide drum 10 consists of a rotatable upper drum 2 and a stationary lower drum 3. Rotatable upper drum 2 is normally rotated at a high speed of, suitably, 60 revolutions per second through a driving axis 8 by a motor 4. Stationary lower drum 3 is non-rotatively fixed to a chassis 5. The wrap angle of video tape 1 about tape guide drum 10 is established by a pair of tape guides 6 and 7.

A magnetic head 11 projects through a head window 9 between rotatable upper drum 2 and stationary lower drum 3 to contact the video tape 1. As illustrated in the sectional view of rotatable upper drum 2 in FIG. 2, magnetic head 11 is secured to one end of a bi-morph leaf 12, the other end of which is fixed to rotatable upper drum 2 by any convenient means such as by a screw 15. Bi-morph leaf 12 receives a control signal, produced by conventional means well known in the art, from terminals 14. As the magnetic head 11 is scanned along tracks on video tape 1, video signals are supplied to and/or derived therefrom through terminals 13. Bi-morph leaf 12 is deflected up or down in FIG. 2, as required, depending on the amplitude and polarity of the control signal applied to terminals 14. The magnetic head is thereby enabled to correctly trace a video track formed on video tape 1 at various moving speeds of video tape 1.

A recorded video track pattern produced on video tape 1 by a helical video tape recorder of the type described in FIGS. 1 and 2 is represented in FIG. 3. Rotatable upper drum 2 conventionally rotates at the speed of 60 r.p.s. and magnetic head 11 rotating therewith, moving along video tape 1 in the direction indicated by an arrow b and records one video track VT per revolution on video tape 1. Each video track VT contains the signal of one television field. During recording, video tape 1 travels at a normal tape transport speed in a direction indicated by an arrow a. When a helical video tape recorder/reproducer reproduces the video data recorded in tracks VT at a tape transport speed in the direction of arrow a different from the tape transport speed using during recording, a video track VT must be repeatedly scanned (when the tape transport speed during reproduction is slower than the tape transport speed during recording) to produce still or slow motion, or scanning of some video tracks must be omitted during reproduction (when the tape transport speed during reproduction is faster than that used during recording) to produce fast reproduction. Due to either repetitively scanning or omitting certain recorded tracks, the normal sequential relationship of recorded and reproduced fields is disrupted. In the extreme case of still reproduction, all reproduced video for both odd and even fields is derived from repetitively scanning a single odd or even recorded field.

Bi-morph leaf 12 deflects magnetic head 11 in the width direction of video tracks VT during scanning to compensate for the different skew angles of the path of rotary head 11 along video tape 1 resulting from the changed tape transport speed. Since bi-morph leaves and methods of producing suitable control voltages therefor are well known in the art, a detailed description thereof is omitted.

The following paragraphs describe a composite color synchronizing signal according to the NTSC color television system which is recorded or reproduced by a helical video tape recorder used as an example in this description.

Referring to FIG. 4, there are four kinds of fields which cyclically repeat in the NTSC color television system. The four fields are divided into a color frame A and a color frame B, each of which includes an odd field and and even field. Video tracks VT on video tape 1 (FIG. 3) are recorded with these four types of fields, color field I, color field II, color field III, color field IV, color field I, . . . repeating in order.

Returning now to FIG. 4, between odd color fields (I and III) and even color fields (II and IV), the relationship between the timing of horizontal synchronizing signals and vertical synchronizing signals is shifted by 0.5 H as necessary to produce interlaced scanning. Further, the phase of a color subcarrier signal is the same in color fields II and III, and also the same in color fields IV and I. However, the phase of the color subcarrier in color fields II and III is 180 degrees out of phase with the phase of the color subcarrier in fields I and IV. The phase of the color subcarrier is represented by a waveform below each of the vertical intervals in FIG. 4 aligned with the negative-going trailing edge of the ninth horizontal interval in the vertical blanking interval. It is to be noted that horizontal intervals are identified as odd (1, 3, etc.) or even (2, 4, etc.). The first horizontal interval in which video is displayed is the 21st in odd fields and the 20th in even fields. In addition, television lines can also be designated as odd or even.

A video signal processing system according to the present invention is described with reference to FIG. 5. This embodiment of FIG. 5 is adapted for use with the NTSC color television signal shown in FIG. 4.

A reproducing circuit 20 reproduces a recorded NTSC system color video signal and applies it to an input terminal 22 of a time base corrector 21. It is assumed for purposes of description that the color video reproduced by reproducing circuit 20 is frequency-demodulated and contains horizontal and vertical synchronizing signals and a burst signal in addition to the video signal. The synchronizing signal reproduced by a video tape recorder is normally so distored with time base errors etc., that it is therefore common practice to replace it with locally generated horizontal synchronizing, vertical synchronizing and color burst signals using a reference composite color synchronizing signal generator.

In time base corrector 21, the color video signal from input terminal 22 is applied to an A-D converter 23 where it is converted into a digital color video signal, suitably of 8 bits. The converted digital color video signal is fed to a main memory device 24 for storage therein. The analog color video signal from input terminal 22 is also fed to a synchronizing signal separating circuit 27 to derive therefrom a reproduced horizontal synchronizing signal PB-H, a reproduced vertical synchronizing signal PB-V, and a color burst signal PB-BURST. The color burst signal PB-BURST and the horizontal synchronizing signal PB-H from shychronizing signal separating circuit 27 are applied to a write clock signal generating circuit 29 to derive therefrom a write clock signal having a frequency of, for example, three or four times a color subcarrier frequency (which is 3.58 MHz in the case of NTSC system). The write clock signal is fed to A-D converter 23 and is also fed through a control circuit 28 to main memory device 24 to write the digital color video signal from A-D converter 23 therein. If a time base error is contained in the analog reproduced color video signal fed to input terminal 22, a corresponding time base error is included in the write clock signal. Control circuit 28 also receives the reproduced vertical synchronizing signal PB-V and other synchronizing signals from synchronizing signal separating circuit 27.

A reference composite color synchronizing signal generating circuit 31 produces a set of locally generated synchronizing signals in the NTSC relationship of FIG. 4 including a reference horizontal synchronizing signal, REF-H, a reference vertical synchronizing signal REF-V, a reference color subcarrier signal REF-FSC, and a reference color burst signal REF-BURST. The reference horizontal synchronizing signal, REF-H, and the reference color burst signal, REF-BURST, are applied to a read clock signal generating circuit 30. Read clock signal generating circuit 30 generates a read clock signal of three or four times the color subcarrier frequency corresponding to the frequency of the write clock signal. The locally generated write clock signal, being derived from accurate frequency generating circuits which do not contain substantial time base errors, is itself substantially free of time base errors.

The read clock signal is applied directly to a D-A converter 25 and through control circuit 28 to main memory device 24. The digital video signal, stored in main memory device 24, is read out of main memory device 24 by the read clock signal, reconverted to an analog signal in A-D converter 25 and applied to an output terminal 26 of time base corrector 21.

The field and color phase of a reproduced color video signal obtained, for example, by repeatedly reproducing a television field recorded in a single selected recording track, are compared in color field comparing circuit 35 with the field and color phase of the reference composite color synchronizing signal defined by reference composite color synchronizing signal generating circuit 31. If the odd or even reproduced field corresponds to the odd or even field defined by the reference composite synchronizing signal, color field comparing circuit 35 produces an output signal at terminal 35A which is indicative of this condition. If the phase of the color subcarrier signal of the reproduced field agrees with the phase of the color subcarrier signal provided by reference composite color synchronizing signal generator 31, color field comparing circuit 35 produces an output signal at terminal 35B which is indicative of such agreement.

To this end, the reproduced horizontal and vertical synchronizing signals, PB-H and PB-V, from synchronizing signal separating circuit 27 are supplied to a field detector circuit 36 for discriminating or detecting whether the reproduced field is odd or even and a field discriminating signal PB-FOE therefrom is applied to color field comparing circuit 35. A signal from synchronizing signal separating circuit 27 is supplied to a color subcarrier phase detector circuit 37 for discriminating or detecting the phase of the color subcarrier signal of the reproduced field and a line or color phase discriminating signal PB-LOE therefrom is fed to color field comparing circuit 35.

Reference horizontal and vertical synchronizing signals, REF-H and REF-V, from reference composite color synchronizing signal generating circuit 31 are applied to a reference field detector circuit 38 for discriminating or detecting whether the reference field is odd or even and a discriminated output REF-FOE therefrom is fed to color field comparing circuit 35. A signal from reference composite color synchronizing signal generating circuit 31 is fed to a reference color subcarrier phase detector circuit 39 for discriminating or detecting the phase of the color subcarrier signal of the reference field and a line or color phase discriminated output REF-LOE therefrom is supplied to color field comparing circuit 35. Color field comparing circuit 35 produces at its output terminal 35A a control signal indicative of coincidence or non-coincidence of oddness and evenness of field between the reproduced color video signal and the reference composite color synchronizing signal and also produces at its output terminal 35B a control signal relating to coincidence or non-coincidence between the phases of the two color subcarrier signals.

An output of time base corrector 21 is applied through output terminal 26 to a switch circuit 41 and to a 1 H delay line 40. Switch circuit 41 has a moveable contact m and two fixed contacts e and f. The fixed contact e is connected directly to terminal 26 and the fixed contact f is connected through 1 H delay line 40 to terminal 26. An output of switch circuit 41 is supplied from movable contact m to a luminance-chrominance separating circuit 42 which produces a luminance signal at its output terminal 42a and a chrominance signal at its output terminal 42b, respectively.

A luminance process circuit 43 receives the reproduced luminance signal and forms a first arithmetic mean of the luminance signal connected thereto and a luminance signal delayed in time by one horizontal period (1H). The luminance signal from output terminal 42a is supplied directly to one input of an adder 45 and to a switch circuit 47 as well as through a 1 H delay line 44 to a second input of adder 45. An aded output of adder 45 is fed to an attenuator 46 having an attenuation ratio of one half to derive therefrom the first arithmetic mean signal. This first arithmetic means signal is used as a luminance interpolation signal, as its amplitude is interpolated between those of the luminance signals in the two lines from which it is formed. Switch circuit 47 has a movable contact m and fixed contacts a and b for selectively changing over the between reproduced luminance signal at fixed contact a and the first arithmetic mean signal from luminance process circuit 43 at fixed contact b.

A chrominance process circuit 48, receives the reproduced chrominance signal and forms a second arithmetic means signal. Since the phase of the chrominance signal is inverted from line to line, summing of the chrominance from successive lines requires either subtraction or inversion of one of the signals rather than addition. In the embodiment of FIG. 5, the chrominance signal from output terminal 42b is supplied directly to an additive input of a subtractor 50 and to a switch 52 as well as through a 1 H delay line 49 to a subtractive input of subtractor 50 for subtracting the delayed signal from the undelayed signal. An adder may be substituted for subtractor 50 if an inverter (not shown) is connected in the signal path to the adder. The subtracted (effectively summed) signal from subtractor 50 is fed to an attenuator 51 having an attenuation ratio of one half to derive therefrom the second arithmetic mean signal. Switch circuit 52 has a movable contact m and fixed contacts a and b. The chrominance signal from output terminal 42b is applied directly to fixed contact a and the second arithmetic mean signal from chrominance process circuit 48 is fed to fixed contact b. Switch circuit 52, ganged with switch circuit 47, is selectively changed over between the reproduced chrominance signal and the second arithmetic mean signal from chrominance process circuit 48. This second arithmetic mean signal is used as a chrominance interpolation signal, as its amplitude and phase are interpolated between those in the chrominance signals in the two lines from which it is formed.

Switch circuits 47 and 52 are controlled by the control signal from output terminal 35A relating to coincidence and non-coincidence between oddness and evenness of the reproduced and reference fields. When the oddness or evenness of the field of the reproduced color video signal coincides with the reference composite color synchronizing signal, movable contacts m of switch circuits 47 and 51 are placed in contact with their fixed contacts a as illustrated wherein they bypass the luminance and chrominance process circuits, but when the fields are not coincident, movable contacts m are changed over to their contacts b which thus apply the arithmetic means values of the luminance and chrominance signals to succeeding circuits.

A switch circuit 54 is provided to selectively change over between the chrominance direct or arithmetic mean output of switch circuit 52 and an inverted signal therefrom. Switch circuit 54 has a movable contact m and fixed contacts c and d. The output from switch circuit 52 is supplied through an inverter 53 to fixed contact c and is also directly supplied to fixed contact d. Switch circuit 54 is controlled by the control signal from output terminal 35B which is related to the coincidence or non-coincidence of the phase of the color subcarrier signal in the reproduced color video signal and in the reference composite color synchronizing signal. When the color subcarrier signal phases are coincident, movable contact m is changed over to fixed contact d is illustrated, but when they are not coincident, movable contact m is changed over to fixed contact c.

The outputs of switch circuits 47 and 54 are applied to an adder 55 where they are added to the reference horizontal REF-H, reference vertical REF-V synchronizing signals and the reference burst signal REF-BURST from reference composite color synchronizing signal generating circuit 31. Thus, a processed composite color video signal is supplied to output terminal 56 from adder 55.

Switch circuit 41 and 1 H delay line 40 determines whether averaged video is shifted upward or downward. When switch circuit 41 is in the condition shown, the video output of D-A converter 25, delayed 1 H in delay line 40 is defined as the n th line. Thus, when this signal and the additionally delayed signal of the n+1 th line are arithmetically averaged, the resultant averaged video, when displayed, is displaced downward a half pitch. In contrast, when switch circuit 41 is in its opposite condition, thus bypassing delay line 40, the n−1 th line is averaged with the n th line to displace the displayed image upward a half pitch.

AND circuit 57 receives the field-coincidence output from terminal 35A of color field comparing circuit 35 at one input and the output from field detecting circuit 38 at a second input. Normally, movable contact m of switch circuit 41 is positioned at fixed contact f as illustrated, thus providing for averaging lines n and n+1, but when the field of the reference composite color synchronizing signal is even and the field of the reproduced color video signal is odd, movable contact m is changed over to fixed contact e, thus providing for averaging lines n−1 and n. By performing such averaging throughout the processing of an even reproduced field, for example, a synthetic odd field is generated which is not displaced vertically with respect to the even reproduced field on which such averaging is not performed. Conversely, when the field of the reference composite color synchronizing signal is odd and the field of the reproduced color video signal is even, movable contact m of switch 41 is moved to its fixed contact f, thus delaying the signal in 1 H delay line 40. The reproduced video signal of the n th line delayed 1 H in delay line 40 and the reproduced video signal of the n+1 th line, delayed in both delay lines 40 and 44, are similarly averaged to produce an output appropriate to substitute for the n th line of the odd field.

Chrominance process circuit 48 and switch circuit 52 perform a similar process on the chrominance signal except that, since the color subcarrier signal is inverted in phase from line to line, one of the two chrominance signals must be subtracted from the other in subtractor 50. An equivalent process includes inverting one of the delayed or undelayed chrominance signals and then adding them to produce an arithmetic mean.

As described above, when odd or even fields do not coincide, the field of the reference composite color synchronizing signal is taken as a standard and that of the video of the reproduced color video signal is adjusted a half pitch upward or downward by averaging video from a pair of adjacent reproduced field lines to produce an interpolated signal appropriate for the field defined by the reference synchronizing signal. Since the color subcarrier signal of respective fields differ in phase in the manner shown in FIG. 4, switch circuit 54 is changed over as required to invert the processed chrominance signal to make it coincident in phase with the reference composite color synchronizing signal.

The operation of the video signal processing system is further described with reference to Table I which is related to the embodiment of FIG. 5. In Table I, the necessity for applying interpolation or averaging to the reproduced luminance and chrominance signals and the necessity for applying phase inversion to the reproduced chrominance signal are shown respectively for fields $F_1$-$F_4$ relative to the fields of the reference composite color synchronizing signal. The reference color fields are grouped in Table I in three of the four possible repeating sequences, namely field $F_4$ through field $F_3$ (example X), field $F_2$ through field $F_1$ (example Y), and field $F_3$ through field $F_2$ (example Z), respectively. The fourth possible repeating sequence of the reference fields coincides with the sequence of reproduced field and is not included in Table I.

TABLE I

| Color Field of Reproduced Video | Color Field of Reference Sync. | Interpolation | Lines Being Interpolated | Chroma Phase Inversion |
|---|---|---|---|---|
| $F_1$ | $F_4$ | necessary | n, n+1 | necessary |
| $F_2$ | $F_1$ | necessary | n−1, n | necessary |
| $F_3$ | $F_2$ | necessary | n, n+1 | necessary |
| $F_4$ | $F_3$ | necessary | n−1, n | necessary |
| $F_1$ | $F_2$ | necessary | n, n+1 | unnecessary |
| $F_2$ | $F_3$ | necessary | n−1, n | unnecessary |
| $F_3$ | $F_4$ | necessary | n, n+1 | unnecessary |
| $F_4$ | $F_1$ | necessary | n−1, n | unnecessary |
| $F_1$ | $F_3$ | unnecessary | — | necessary |
| $F_2$ | $F_4$ | unnecessary | — | necessary |
| $F_3$ | $F_1$ | unnecessary | — | necessary |
| $F_4$ | $F_2$ | unnecessary | — | necessary |

For purposes of explaining the chroma phase inversion column in Table I relating to examples X and Y, the color phase of the lines of each color field are arbitrarily assigned a polarity. The assigned polarities of lines n−1, n and n+1 of color fields I-Iv are shown in Table II.

TABLE II

| | COLOR PHASE | | |
|---|---|---|---|
| LINE NUMBER | n−1 | n | n+1 |
| COLOR FIELD I | MINUS | PLUS | MINUS |
| COLOR FIELD II | PLUS | MINUS | PLUS |
| COLOR FIELD III | PLUS | MINUS | PLUS |
| COLOR FIELD IV | MINUS | PLUS | MINUS |

In the first row of example X in Table I, reproduced color field I is to be combined with reference synchronizing signals from reference color field IV. During interpolation in chrominance process circuit 48 (FIG. 5), reproduced chrominance from line n+1 of field I (minus phase) is applied to the adding input of subtractor 50 and reproduced chrominance from line n of field I (plus phase), delayed 1 H be delay line 49, is applied to the subtracting input of subtractor 50. Thus the subtracted output of subtractor 50 is line n+1 (minus phase)−(line n [plus phase]) which gives a result having a minus phase. The averaged line from field I is substituted for the n th line of field IV. However, the phase of the n th line of reference field IV should be plus (Table II). Therefore chroma phase inversion is necessary as indicated in the first row of example X of Table I.

As a further example, the second row of example X of Table I employs reference color synchronizing signals from color field II with reproduced chrominance signals from color field I. As noted, the interpolated reproduced chrominance signal is formed by subtracting the n−1 th line of field II (plus phase) from the n th line of field II (minus phase). This results in a minus phase interpolated signal. But since the n th line of reference color field I should have plus phase, chroma phase inversion is again necessary.

The analysis used in preceding paragraphs can be used for determining whether chroma inversion of the interpolated signals is necessary in each of the remaining rows of examples X and Y. Since interpolation is not used in example Z, this analysis is not necessary.

Although inverter 53 and switch circuit 54 are located after switch circuit 52, they may be relocated ahead of chrominance process circuit 48 without changing the function of the circuit.

Although the foregoing discussion of FIG. 5 assumes that the signal to be processed is a color video signal, a black and white video signal may also be processed. For a black and white video signal, chrominance process circuit 48, switch circuit 52, inverter 53, switch circuit 54, luminance-chrominance separating circuit 42, and field color subcarrier signal phase discriminating circuits 37 and 39 are not required. In addition, burst signals from synchronizing signal separating circuit 27 and composite color synchronizing signal generating circuit 31 may be omitted.

The above described video signal processing system permits selecting and repeatedly reproducing an arbitrary recording track on a recording medium, which contains one of four possible fields in an interlaced scanning system video signal. By interpolating the video in fields which do not agree in oddness or evenness with the reference synchronizing signal, vertical vibrations of a picture image on the picture screen do not appear.

The phase inversions noted in Table I are related to the particular embodiment shown in FIG. 5. A change in circuit configuration may require a different pattern of phase inversions which would be clear to one skilled in the art in the light of the present disclosure.

FIG. 6 shows a reproducing circuit 60 and a time base corrector 61 similar to FIG. 5 but in greater detail. Reproducing circuit 60 of a helical video tape recorder delivers a composite color video signal and a drop-out signal to time base corrector 61. Reproducing circuit 60 includes a pre-amplifier 62, to which a frequency modulated video signal is supplied from magnetic head 11 (FIG. 2), a frequency demodulator 63 and a drop-out detecting circuit 64.

A reproduced video signal from helical video tape recorder reproducing circuit 60 is first applied to an input circuit 70 in time base corrector 61. Input circuit 70 includes a chrominance signal process circuit for adjusting the interleaved relationship between the luminance signal and the chrominance signal when the input video signal is of the type suppled by a heterodyne chroma recording system video tape recorder. An output of input circuit 70 is fed to an A-D converter 71 and a synchronizing signal separating circuit 72, respectively. A-D converter 71 converts the input video signal into, for example, an 8-bit digital code signal. The converted digital video signal is fed through a drop-out compensating circuit 73 to a main memory device 74 where it is memorized. The drop-out compensating circuit 73 is provided with two parallel 8-bit by 640-bit digital memory lines (640 bits×8×2) capable of memorizing two television lines, in which drop-out compensation of either one clock pulse or one line is carried out.

A digital output is read out from main memory device 74, converted to an analog signal in a D-A converter 75 and fed to a signal processing circuit 76 to obtain an analog output at an output terminal 77.

The synchronizing signal separating circuit 72 receives the reproduced video signal to derive therefrom reproduced vertical PB-V and horizontal PB-H synchronizing signals and a reproduced burst signal PB-BURST. The reproduced horizontal synchronizing, PB-H, and burst, PB-BURST signals are supplied to a write clock signal generating circuit 78 for generating a write clock signal. Synchronizing signals from synchronizing signal separating circuit 72 are fed to a control circuit 79 which provides control signals for controlling the system.

A signal from write clock generating circuit 78 is applied to a velocity error memory circuit 80. Velocity error memory circuit 80 delivers a start signal to a read clock signal generating circuit 81 for starting the generation of a read clock signal at the proper time to read out the digital video signal of a line.

A reference synchronizing signal generating circuit 82 receives an external reference signal from an input terminal 83 and delivers predetermined synchronizing signals to read clock signal generating circuit 81 and signal processing circuit 76 wherein the video signal fed from the D-A converter 75 is added to the above predetermined synchronizing signal. Practical examples of these circuits are disclosed in previously filed U.S. patent Ser. No. 911,286; therefore a description of these circuits will be given only in the detail needed to understand the present invention.

Figure 7:
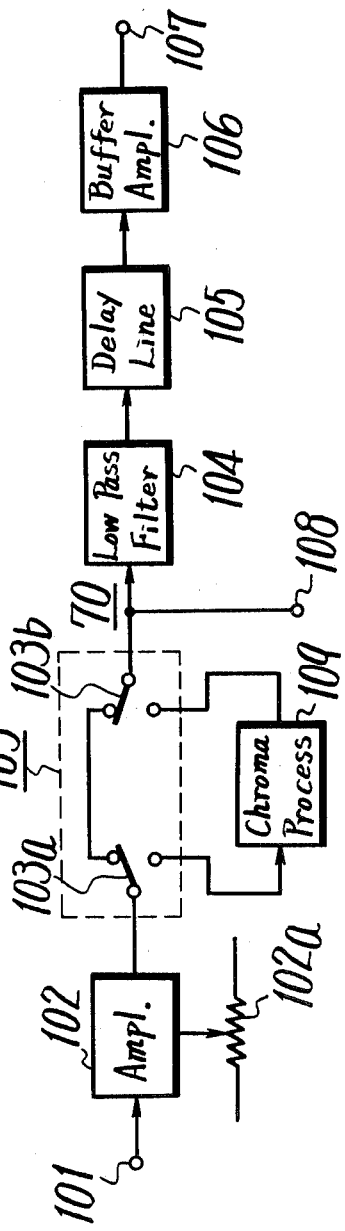
FIG. 7 is a detailed block diagram showing an input circuit of the time base corrector of FIG. 6.

FIG. 7 shows the input circuit 70, previously discussed in connection with FIG. 6, in which an input terminal 101 receives the reproduced video signal from frequency demodulator 63. The reproduced video signal is amplified to a predetermined level by an amplifier 102 and is then supplied through a color mode switch circuit 103, a low pass filter 104, a delay line 105, a buffer amplifier 106 and output terminal 107 to A-D converter 71. Amplifier 102 is associated with a gain adjusting variable resistor 102a. The output of color mode switch circuit 103 is also supplied through an output terminal 108 to the synchronizing signal separating circuit 72 (FIG. 6). Low pass filter 104 removes high frequency components, and delay line 105 adjusts the time relationship between the video signal and the write clock signal obtained through synchronizing signal separating circuit 72 (FIG. 6) from write clock signal generating circuit 78.

Color mode switch circuit 103 has ganged cascade-connected single-pole double-throw switches 103a and 103b which are connected to selectively feed the video signal through or to bypass a chroma signal process circuit 109. When the input video signal is delivered from, for example, a direct recording system video tape recorder which records an unmodified NTSC color television signal, the video signal bypasses chroma signal process circuit 109 through switch contacts 103a and 103b in the positions shown in FIG. 7 directly to output terminal 108 and low pass filter 104. When the input video signal is reproduced from a heterodyne recording system video tape recorder, (wherein a chrominance signal is frequency converted to a low frequency range for recording, and then reconverted to its original frequency upon reproducing, it is subjected to an automatic phase control process or the like and only the chrominance signal has a jitter component removed therefrom) the video signal is passed through chrominance signal process circuit 109 which converts the signal into one having an interleaved relationship between the luminance and chrominance signals.

Figure 8:
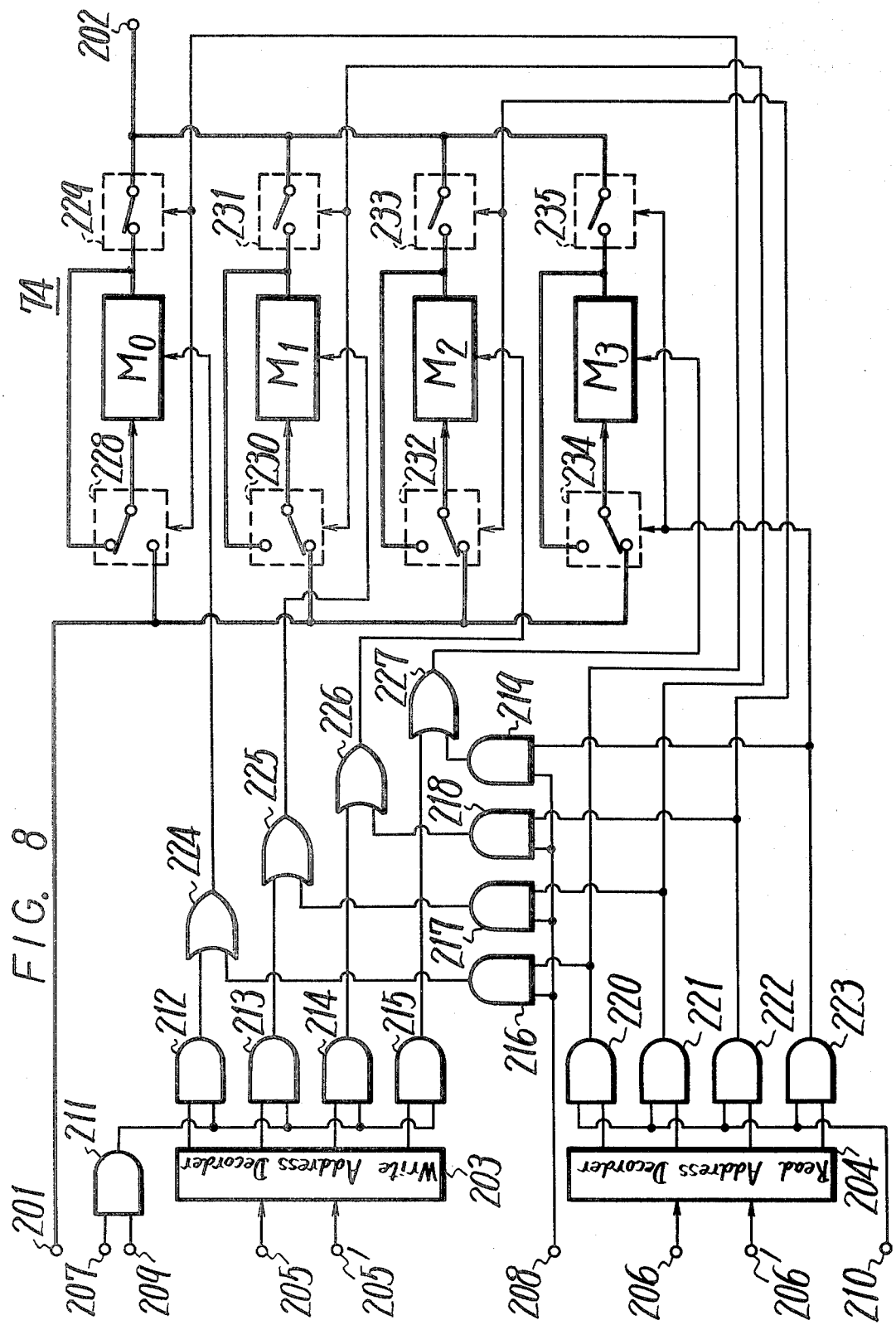
FIG. 8 is a logic diagram showing a main memory device of the time base corrector of FIG. 6.

Main memory device of FIG. 6 is described in detail with reference to FIG. 8. The digital video signal from dropout compensating circuit 73 (FIG. 6) is applied to an input terminal 201 of main memory device 74. Digital output data read out from main memory device 74 are fed through an output terminal 202 to D-A converter 75 (FIG. 6). A write address decoder 203 and a read address decoder 204 each receives a 2 bit address code from control circuit 79 (FIG. 6) at respective input terminals 205, 205', and 206, 206'. Input terminals 207 and 208 respectively receive a write clock signal and a read clock signal. Input terminals 209 and 210 respectively receive a write enable signal and a read enable signal. Memories $M_0$–$M_3$ each contain two 8 bit shift registers of 640 words length. Thus each of memories $M_0$–$M_3$ is capable of containing digital video of two lines. One of memories $M_0$–$M_3$ is cyclically assigned to the read out task in which output digital video data are supplied through its associated output switch circuits 229, 231, 233 or 235 to output terminal 202 and the digital data being read out are fed back through its associated input switch 228, 230, 232 or 234 to its input. One of the remaining memories $M_0$–$M_3$ is cyclically assigned to the storage or write task. By way of example, assume that an output of read address decoder 204 receives memory address code inputs to select memory $M_0$. Output switch circuit 229 is closed to provide video data from memory $M_0$ to output terminal 202 and input switch circuit 228 is changed over to recycle the ouput of memory $M_0$ to its input. Inputs of the three other memories $M_1$, $M_2$ and $M_3$ are connected by closed contacts of input switch circuits 230, 232, and 234 to the incoming digital video signal from input terminal 201. Outputs of memories $M_1$–$M_3$ are disconnected from output terminal 202 by open contacts of switch circuits 231, 233 and 235. Only one of memories $M_0$–$M_3$ is normally placed in the write condition at any time by control signals fed thereto as will be explained. For example, if memory $M_2$ is in the write condition under control of a control signal from address decoder 203, memory $M_2$ receives a write clock signal and thus stores new data while memory $M_0$ receives a read clock signal and thus read out previously stored data. Thus data are read out of memory $M_0$ while new data are written into memory $M_2$. Memories $M_1$ and $M_3$, lacking control signals from address decoder 203, remain inactive.

AND circuits 211 through 223 and OR circuits 224 through 227, in cooperation with read address decoder 204 and write address decoder 203, control the assignment of the read and write tasks under control of input memory address signals. Although not shown in FIG. 8, either one of the two 8-bit by 640-word shift registers in the memory assigned to the write task may be employed to store digital video data.

Figure 9:
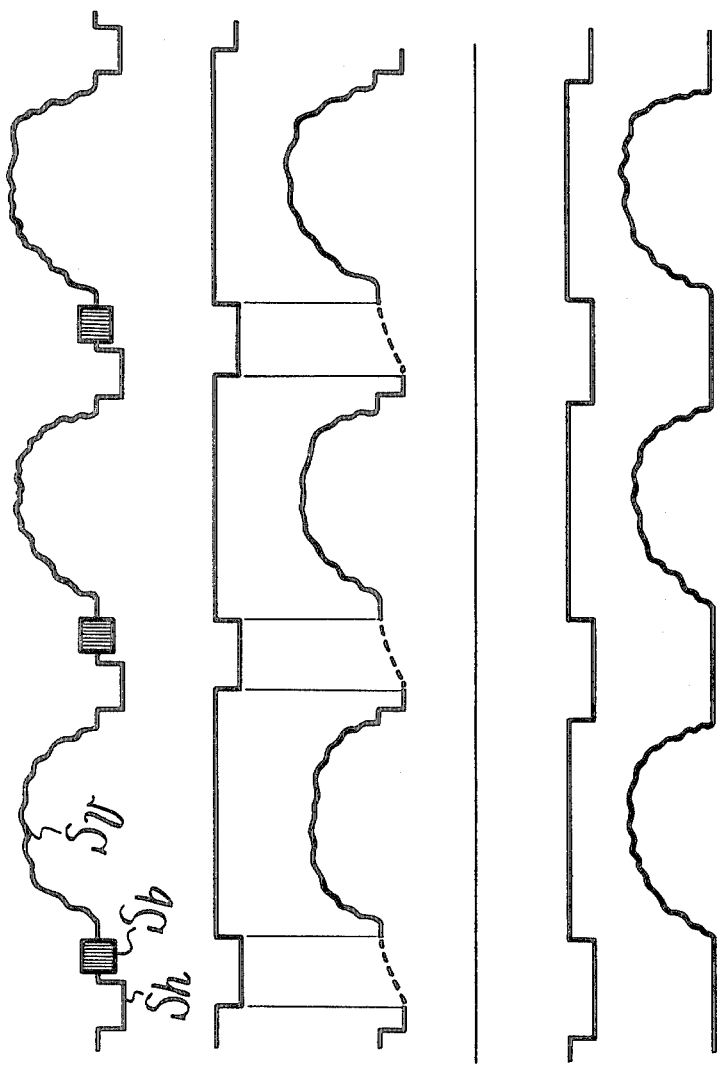
FIGS. 9A to 9E are waveform diagrams to which reference will be made in explaining the manner in which signals are processed in the time base corrector of FIG. 6.

The manner in which digital video data are memorized is described with reference to FIGS. 9A through 9E. FIG. 9A shows an input color video signal, which consists of a horizontal synchronizing signal portion $S_h$, a color burst signal portion Sb, and a video signal portion Sv. A memory write enable signal produced by control circuit 79 (FIG. 6) is shown in FIG. 9B, in which a high, or positive, level defines an interval in which memory operation of main memory device 74 is enabled or permitted and a low, or negative level defines an interval in which memory operation is inhibited or prevented. The low or inhibiting level in FIG. 9B encompasses the portion of a horizontal interval containing the color burst Sb. Accordingly, the digital video signal stored in main memory device 74 and later obtained at the output side of main memory device 74 is only the portion shown in FIG. 9C by solid lines from which the color burst region is deleted. An 8-bit blanking signal is fed to D-A converter 75 during the low intervals of the blanking pulse shown in FIG. 9D. The 8-bit blanking signal has a level corresponding to a pedestal level during the horizontal blanking interval. Accordingly, the output of D-A converter 75 has a waveform as shown in FIG. 9E, in which only the pedestal level is reproduced by D-A converter 75 between video signal portions $S_v$.

Figure 10:
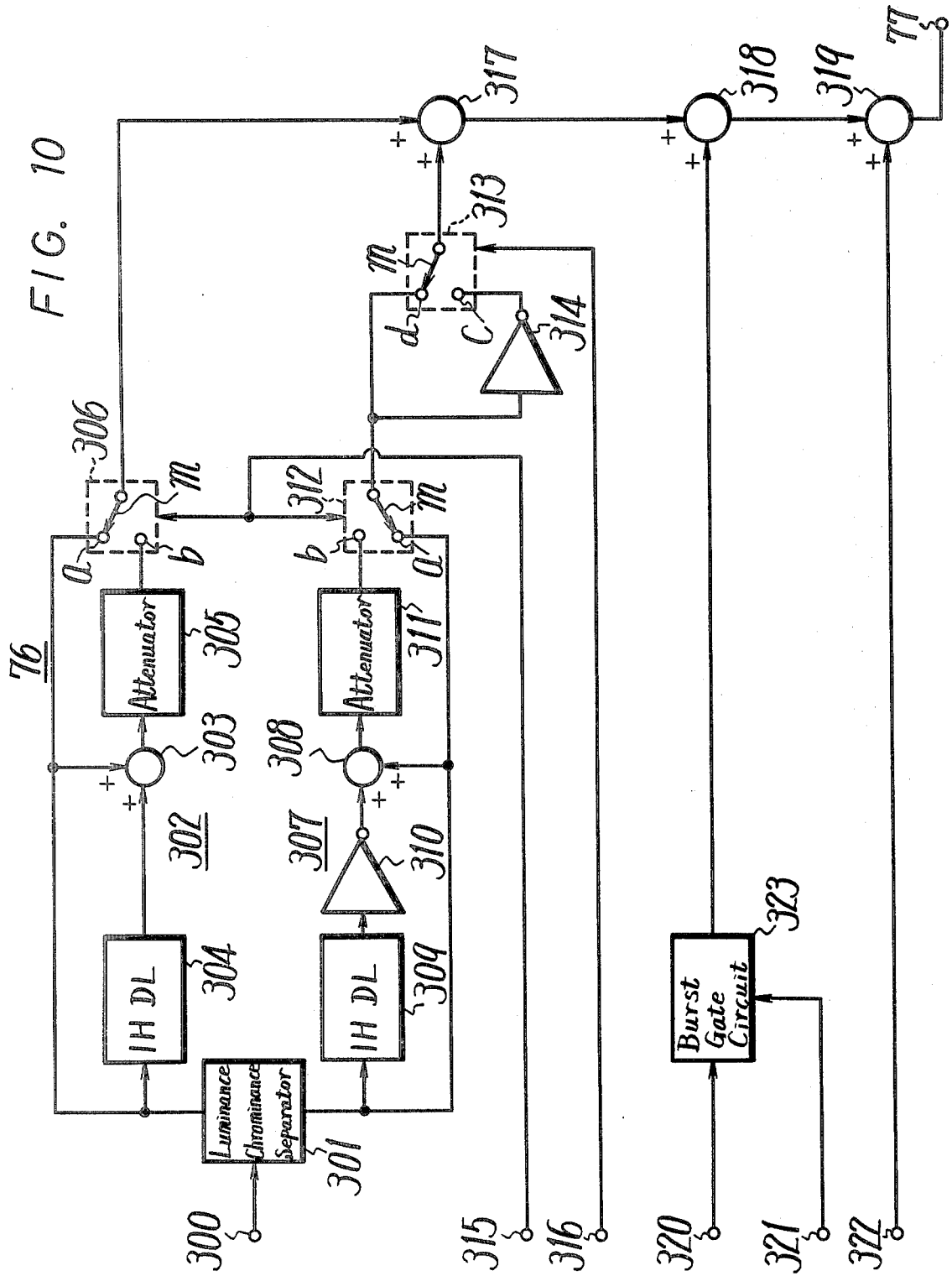
FIG. 10 is a detailed block diagram showing a signal processing circuit of a time base corrector suitable for use in the circuit of FIG. 6.

The analog video output thus obtained from D-A converter 75 is supplied to an input terminal 300 of signal processing circuit 76 shown in detail in FIG. 10. It will be noted that signal processing circuit 76 of FIG. 10 is very similar to the circuits in FIG. 5 made up of luminance-chrominance separating circuit 42, luminance process circuit 43, chrominance process circuit 48, switch circuits 47, 52, and 54, inverter 53 and adder 55. The reconverted color video signal applied to input terminal 300 is delivered to a luminance-chrominance separating circuit 301 to derive therefrom a luminance signal and a chrominance signal. A luminance process circuit 302 receives the reproduced luminance signal and produces a first arithmetic mean signal of the luminance signals of adjacent two lines are previously described.

Similarly a chrominance process circuit 307, receives the reproduced chrominance signal in the reproduced video signal and produces a second arithmetic mean signal of the chrominance signals of adjacent two lines as previously described. The operation of luminance and chrominance process circuits 302 and 307 with associated circuits shown in FIG. 10 can be understood by reference to the description of corresponding elements of FIGS. 4 and 5 and Table I. The principal difference between the circuits of FIGS. 5 and 10 is the use of an inverter 310 in FIG. 10 following 1 H delay line 309. This permits the use of an adder 308 rather than the subtractor 50 used in a corresponding location in FIG. 5. In addition, three separate adders 317, 318 and 319 are shown in FIG. 10 to combine the two components of the reconverted video, the color burst and the reference composite synchronizing signal into a composite color video signal rather than the single adder 55 used for these purposes shown in FIG. 5.

A reference color subcarrier signal REF-FSC, a burst flag and a reference composite synchronizing signal are respectively applied to input terminals 320, 321 and 322. A burst gate circuit 323, which was considered to be part of reference composite color synchronizing signal generating circuit 31 in FIG. 5, is separately shown in FIG. 10. Burst gate circuit 323 provides a reference color burst signal REF-BURST to adder 318. Field coincidence and color phase coincidence signals at input terminals 315 and 316 respectively are employed by corresponding parts in FIG. 10 in the same manner as described in FIG. 5.

Figure 11:
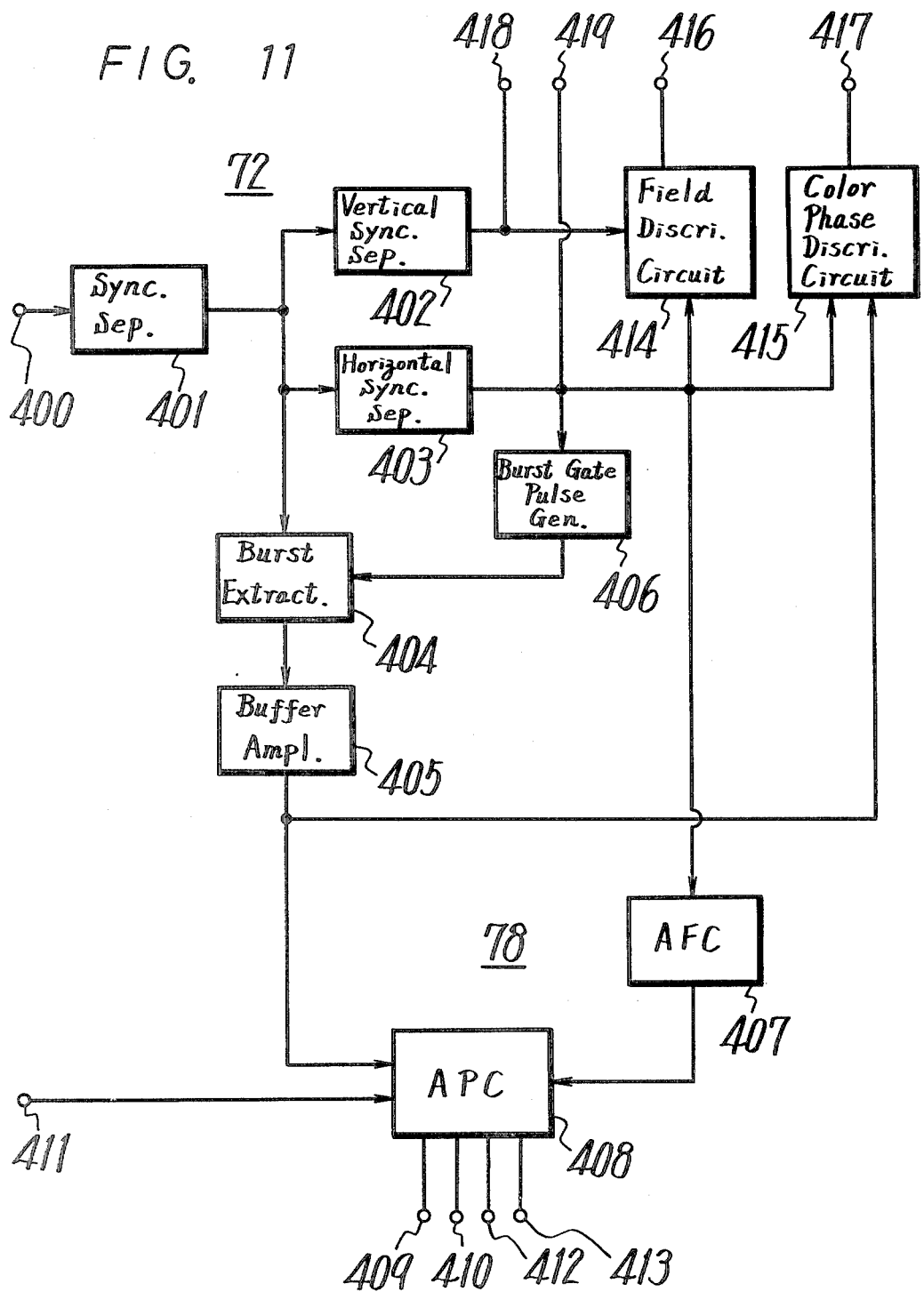
FIG. 11 is a simplified block diagram showing a synchronizing signal separating circuit and a write clock signal generating circuit suitable for use in the circuit of the time base corrector of FIG. 6.

FIG. 11 shows details of the synchronizing signal separating circuit 72 and write clock signal generating circuit 78 previously discussed in connection with FIG. 6. The reproduced color video signal from input circuit 70 is applied through an input terminal 400 to a synchronizing signal separator circuit 401 wherein a video signal portion is removed from the reproduced color video signal and the reproduced synchronizing PB-V and PB-H and reproduced color burst PB-BURST portions are applied to succeeding circuits. An output of synchronizing signal separator circuit 401 is applied in parallel to a vertical synchronizing signal separating circuit 402, a horizontal synchronizing signal separating circuit 403 and a color burst extracting circuit 404, to derive therefrom a reproduced vertical synchronizing signal PB-V, a reproduced horizontal synchronizing signal PB-H, and a reproduced color burst signal PB-BURST, respectively. The reproduced color burst signal PB-BURST from color burst extracting circuit 404 is applied to a buffer amplifer circuit 405 to derive therefrom the final reproduced color burst signal PB-BURST. The reproduced color burst signal PB-BURST from color burst extracting circuit 404 is controlled by a burst gate pulse formed by applying the reproduced horizontal synchronizing signal PB-H to a burst gate pulse generating circuit 406.

Write clock generating circuit 78 is composed of an automatic frequency control circuit 407 and an automatic phase control circuit 408, both of which are conventional and thus explanation of their detailed construction and operation is omitted. Automatic frequency control circuit 407 receives the reproduced horizontal synchronizing signal PB-H to produce a signal having a high frequency, suitably $12 \times f_{sc} = 12 \times 3.58$ MHz. This high frequency signal, being based on the reproduced horizontal synchronizing signal PB-H, contains the same time base variations as the horizontal synchronizing signal PB-H itself. The high frequency signal from automatic frequency control circuit 407 is fed to automatic phase control circuit 408. In automatic phase control circuit 408, this signal of $12 \times f_{sc}$ is controlled to follow the time base variations of the reproduced burst signal PB-BURST from buffer circuit 405, and finally a reproduced subcarrier signal PB-FSC of 3.58 MHz and a write clock signal of $3.58 \times 3 = 10.74$ MHz both containing the time base variations of the input reproduced color video signal are respectively obtained at output terminals 409 and 410. Automatic phase control circuit 408 receives a write enable signal from control circuit 79 (FIG. 6) through an input terminal 411 to produce an $\overline{APC}$ signal at output terminal 412 and a velocity error signal at output terminal 413. The $\overline{APC}$ signal, which indicates that a burst portion of the input reproduced color video signal is disturbed by dropout, is used for controlling dropout compensating circuit 73 (FIG. 6) so that during any horizontal scanning interval in which $\overline{APC}$ signal is generated, the digital video signal is entirely replaced by the outputs of the dropout compensating memories. A reproduced field discriminating circuit 414 receiving the reproduced vertical PB-V and horizontal PB-H synchronizing pulses from vertical 402 and horizontal 403 synchronizing signal separating circuits, produces a reproduced field discriminating signal PB-FOE depending on whether the field is odd or even. A reproduced color phase discriminating circuit 415, receiving the reproduced horizontal synchronizing signal PB-H and the reproduced color burst signal PB-BURST, produces a reproduced line discriminating signal PB-LOE depending on the color phase of the reproduced signal. The reproduced field discriminating signal PB-LOE, and the reproduced line discriminating signal PB-LOE are supplied through terminals 416 and 417 respectively to control circuit 79 together with the reproduced vertical synchronizing signal PB-V and the reproduced horizontal synchronizing signal PB-H through terminals 418 and 419 respectively.

Referring now to FIG. 12, there is shown a detailed block diagram of control circuit 79 for providing the control signals to other circuits shown in FIG. 6. Control circuit 79 controls the timing of the read and write operations as well as designating specific memory locations for these functions. In addition, gating circuits determine when interpolation (Table 1) is required and also when color phase inversion (Table 1) should be performed.

Writing is controlled by a write start pulse generating circuit 504, a 640 bit counter 506, a flip-flop circuit 514, monostable multivibrators 516 and 534, an AND circuit 518 and a 2-bit counter 520. Write digital comparator 524 and inverter 526 are employed to prevent conflict between writing and reading functions as will be explained. For purposes of initial description, it is assumed than an output of inverter 526 is "1". This maintains one input of AND circuit 518 enabled.

The reproduced horizontal synchronizing pulse PB-H from synchronizing signal separating circuit 72 (FIG. 6) is applied through a terminal 500 to one input of write start pulse generating circuit 504. A reproduced color subcarrier signal PB-FSC from write clock generating circuit 78 is applied through a terminal 501 to a second input of write start pulse generating circuit 504. A write clock signal, such as produced by automatic phase control circuit 408 (FIG. 7) at its terminal 410 is applied through a terminal 510 to a clock input terminal of write start pulse generating circuit 504 and 640 bit counter 506. Write start pulse generating circuit 504 produces a write start pulse, shown in FIG. 13B, which has the relationship to the reproduced horizontal synchronizing signal PB-H shown in FIG. 13A. The write start pulse is applied to terminal 505 as well as to the start input of 640 bit counter 506. Upon receiving the write start pulse, the output of 640 bit counter 506 goes high and remains so until 640 bit counter 506 has completed counting 640 cycles of the write clock signal and then goes low awaiting the next write start pulse. The output of 640 bit counter 506 is applied to a write memory enable terminal 512 as well as to an enable input of flip-flop circuit 514. A line discriminating signal PB-LOE, indicating whether the reproduced line is odd or even (color phase plus or minus) is applied to the second input of flip-flop circuit 514. At the negative going edge of the write enable signal, an output of flip-flop circuit 514 assumes the condition designated by the line discriminating signal PB-LOE which depends on the color phase of the line being reproduced. The output of flip-flop circuit 514 is shown in FIG. 13D. Thus, the line or color phase discriminating signal PB-LOE existing at terminal 530 at the end of the write memory enable signal is stored in flip-flop circuit 514. The output of flip-flop circuit 514 is applied to a preset input of a 1-bit memory 531 and to an output terminal 522", from whence it is connected to main memory device 7 (FIG. 8). Since each of memories $M_0$–$M_3$ contains two parallel 8-bit by 640 word memories, the stored PB-LOE signal available at terminal 522" may be employed to control which of the two parallel storage elements in a designated memory will contain the word being written.

At the negative-going trailing edges of outputs of flip-flop circuit 514 (FIG. 13D), monostable multivibrator 516 is triggered into providing an output pulse as shown in FIG. 13E. The output pulse from monostable multivibrator 516 is coupled through AND circuit 518 to an input of 2 bit counter 520. 2 bit counter 520 increments one count upon receiving the output of monostable multivibrator 516. The two output bits from 2 bit counter 520 are connected to output terminals 522 and 522'. These two output bits are connected to terminals 205 and 205' (FIG. 8) which control write address decoder 203. The two output bits of 2 bit counter 520 are also applied to two inputs of write digital comparator 524.

Thus, according to the preceding description, control signals for designating a memory into which reproduced video data may be stored and for enabling the writing are produced. With each succeeding line, the number stored in 2 bit counter 520 is incremented by one thus designating the next succeeding memory $M_0$–$M_3$ for the memory function.

Reading is performed under the control of a read start pulse generating circuit 507, a 640 bit counter 508, flip-flop circuits 515 and 540, monostable multivibrators 534 and 517, a 1-bit memory 531, a 2-bit memory 532, an AND circuit 519, and a 2-bit counter 521. Read digital comparator 525 and inverter 527 are provided as part of a memory conflict avoidance circuit as will be explained. For purposes of initial description, it is assumed that inverter 527 produces a continuous enable signal which is coupled to an input of AND circuit 519. Preset monostable multivibrators 536 and 548 produce preset pulses at times dependent upon the condition of switch circuit 537 at their outputs. The condition of switch circuit 537 is determined by an inverter 546 and an AND circuit 547. Exclusive OR circuit 544 determines whether or not interpolation (FIG. 4 and Table I) is required.

The reproduced vertical synchronizing pulse PB-V is applied through terminal 533 to an input of monostable multivibrator 534. At a time corresponding to time A in FIG. 4, monostable multivibrator 534 produces an output pulse which is applied to 1-bit memory 531 and 2-bit memory 432. At the occurrence of the input pulse, the line discriminating signal PB-LOE in the output of flip-flop circuit 514 is preset into 1-bit memory 531. Similarly, the two bit write address then existing in 2-bit counter 520 is stored in 2-bit memory 532. Thus, at time A (FIG. 4) 1-bit memory 531 and 2-bit memory 532 contain all three write address bits which existed at the specific time A in the vertical blanking interval. These values are stored for reference purposes during the entire succeeding field until replaced by a new set of values during the next vertical blanking interval. The reference vertical synchronizing signal REF-V is applied through terminal 535 in parallel to inputs of monostable multivibrators 536 and 548. Monostable multivibrator 536 produces an output pulse at approximately the time A shown in FIG. 4 which thus should coincide with the output pulse from monostable multivibrator 534 associated with the reproduced vertical synchronizing pulse PB-V. Monostable multivibrator 548 produces an output pulse at a time B (FIG. 4) located about 1 H before time A.

The reference horizontal REF-H and reference color subcarrier REF-FSC signals from reference synchronizing signal generating circuit 82 are applied through inputs 503 and 502 respectively to inputs of read start pulse generating circuit 507. The read clock signal from read clock signal generating circuit 81 (FIG. 6) is applied through terminal 511 to clock inputs of read start pulse generating circuit 507 and 640 bit counter 508. A read start pulse is applied from read start pulse generating circuit 507 to terminal 509 and to an input of 640 bit counter 508. Upon receiving the read start pulse, the output of 640 bit counter 508 goes high and remains so during counting of 640 clock cycles. This high signal is fed through read memory enable terminal 513 to terminal 216 (FIG. 8) for enabling reading by main memory device 74. In addition, the read memory enable signal is applied to an input of flip-flop circuit 515. Flip-flop circuit 515, which was preset by an output of 1-bit memory 531 at time A during the vertical blanking interval, cycles between set and reset conditions in response to each read memory enable signal. The output signal of flip-flop circuit 515 is applied to monostable multivibrator 517 and to an output terminal 523". The signal applied to output terminal 523" may be employed in main memory device 74 to select one of the 2-bit by 640 word storage devices in a selected one of memories $M_0$–$M_3$. Monostable multivibrator 517 produces an output pulse similar to the pulse shown in FIG. 13E which is applied through AND circuit 519 to 2-bit counter 521. Thus, 2-bit counter 521, initially preset at time A by the outputs of 2-bit memory 532, is advanced one count per horizontal interval. The two outputs of 2-bit counter 521 are applied to output terminals 523 and 523' which are thereupon connected to input terminals 206 and 206' (FIG. 8) which control the read address in read address decoder 204. Thus, the proper one of memories $M_0$–$M_3$ is selected by the address bits on terminals 523, 523' and 523".

If steps are not taken to prevent it, there is a probability that the read address on output terminals 523, 523' and 523" could designate the same one of memories $M_0$–$M_3$ that is designated by the write address on terminals 522, 522' and 522". This is prevented by digital comparators 524 and 525, inverters 526 and 527 and AND circuits 518 and 519. Write digital comparator 524 receives all four address bits from 2-bit counter 520 and 2-bit counter 521. If its inputs are in the condition $W = R - 1$ (where W and R are write address and read address numbers respectively) a high output from write digital comparator 524 is applied to an input of inverter 526. The resulting low or inhibiting output from inverter 526, applied to an input of AND circuit 518 inhibits, or makes non-conductive, AND circuit 518 and prevents the next succeeding pulse from monostable multivibrator 516 from reaching and incrementing 2-bit counter 520. Thus, the address produced by 2-bit counter 520 is never permitted to advance into coincidence with the read address from 2-bit counter 521. Similarly all four address bits from 2-bit counters 520 and 521 are applied to read digital comparator 525. Read digital comparator produces a high output when $R = W - 1$. The resulting low or inhibiting output of inverter 527, applied to one input of AND circuit 519 inhibits, or makes non-conductive, AND circuit 519. Consequently, an output pulse from monostable multivibrator 517 is prevented from passing through inhibited AND circuit 519 to increment 2-bit counter 521 one step into coincidence with the number stored in 2-bit counter 520. Therefore, 2-bit counter 521 is prevented from containing the same address as 2-bit counter 520.

An output of 1-bit memory 531 is applied to an input of exclusive OR circuit 539. The reference line, or color phase, discriminating signal REF-LOE is applied through terminal 538 to the second input of exclusive OR circuit 539. It will be recalled that the output of 1-bit memory 531 stores, for a period equal to a field, the line or phase discriminating signal which existed at the preceding time A (FIG. 4). Consequently, the output of exclusive OR circuit 539 becomes "1" when the condition of the line discriminating signal REF-LOE differs from the condition of the stored line discriminating signal. The resulting output from exclusive OR circuit 539 is applied to a toggle input of flip-flop 540. The output of flip-flop 540, which reverses its condition from line to line, is applied through terminal 541 to signal circuit 76 (FIG. 6).

Initial conditions of flip-flop circuit 515 and 540 and 2-bit counter 521 are established during the vertical blanking interval by an output from one of monostable multivibrators 536 and 548. The reference vertical synchronizing signal REF-V is applied through terminal 535 in parallel to inputs of monostable multivibrators 536 and 548. The condition of switch circuit 537 determines which of monostable multivibrators 536 and 548 is effective to produce a preset enable pulse at its output. Monostable multivibrator 536 produces an output pulse which coincides with time A shown in FIG. 4 (which also coincides with the output of monostable multivibrator 534). Monostable multivibrator 548 produces an output pulse at time B (FIG. 4) which precedes time A by approximately 1 H. Thus, if the output of monostable multivibrator 536 is connected through switch 537 to flip-flops 515 and 540 and 2-bit counter 521, presetting of these circuits is effective to include the newly updated data available at their inputs. Conversely, if the output of monostable multivibrator 548 is employed for resetting the circuits, this signal, occurring at time B prior to time A, presets the color phase occurring 1 H before time A and effectively reverses the polarity of the color phase signal preset into flip-flop circuits 515 and 540.

The control signal for switch circuit 537 is produced by AND circuit 547 and inverter 546. The reproduced field (odd or even) discriminating signal PB-FOE is applied through a terminal 542 to one input of AND circuit 547. This signal is high when the reproduced field is odd. The reference field discriminating signal REF-FOE is applied through terminal 543 to an input of inverter 546, inverted therein and applied to the second input of AND circuit 547. The reference field discriminating signal is also high or "1" when the reference field is odd. Consequently, both inputs of AND circuit 547 are enabled when the reference field is even and the reproduced field is odd as indicated by arrows in Table I. Under this condition, switch circuit 537 connects the preset enable output at time B from monostable multivibrator 548 to succeeding circuits. Under all other conditions of odd or even reference and reproduced field, switch circuit 537 connects the output of monostable multivibrator 536 at time A to succeeding circuits. It will be recalled that a 1 H delay circuit 40 (FIG. 5) is deleted from the signal path by operation of a switching circuit 41 when, and only when, the reference field is even and the reproduced field is odd. The use of the output timing of monostable multivibrator 548 to preset flip-flops 515 and 540 under these same conditions compensates for the additional phase reversal which would otherwise occur by deleting 1 H delay circuit 40 from the signal path.

The reproduced and reference field discriminating signals PB-FOE and REF-FOE from terminals 542 and 543 respectively are applied to inputs of exclusive OR circuit 544. An output of exclusive OR circuit 544, which is high or "1" when its inputs differ is applied through terminal 545 to signal processing circuit 76. The signal from terminal 545 produces interpolation under conditions X and Y of Table 1.

According to the above embodiments, even when the reproduced and reference fields are not coincident, a picture having its time base corrected and with no vertical vibration is obtained.

Furthermore, when the reproduced video signal is a color video signal, even though the reproduced color subcarrier signal is non-coincident with the reference color subcarrier signal, the time base corrector according to the present invention permits display of a steady picture image in which color disturbance does not occur.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A video signal processing system for processing a reproduced video signal having at least one type of television field containing television lines, said at least one type of television field being one of an odd field or an even field, comprising: reference synchronizing signal generating means for generating a reference synchronizing signal operative to define a plurality of types of reference television fields in a predetermined repeating order; means for detecting non-coincidence between a characteristic identifying said at least one type of reproduced television field and a characteristic identifying one of said plurality of types of reference television fields and for producing a signal in response thereto; means for mixing reproduced video signals of an adjacent two of said television lines to produce an interpolated signal representing an average of the video signals of said adjacent two television lines; and selective means for selectively producing output video signals containing only one of said reproduced video signal and said interpolated video signal in response to said signal from said means for detecting.

2. A video signal processing system according to claim 1; wherein said means for mixing includes a delay circuit having a delay time of one horizontal synchronizing interval for producing a delayed reproduced video signal, and means for adding said delayed reproduced video signal and said reproduced video signal to produce said interpolated signal.

3. A video signal processing system according to claim 2; wherein said selective means includes switch means for selecting said reproduced video signal and said interpolated signal.

4. A video signal processing system according to claim 1; wherein said reproduced video signal is a composite NTSC color video signal containing a luminance signal and a chrominance signal.

5. A video signal processing system according to claim 4; further including means for separating said luminance signal and said chrominance signal from said reproduced video signal.

6. A video signal processing system according to claim 5; wherein said means for mixing includes luminance mixing means for mixing at least said luminance signal from an adjacent two of said television lines.

7. A video signal processing system according to claim 6; wherein said means for mixing further includes chrominance mixing means for mixing said chrominance signal from an adjacent two of said television lines to produce an interpolated chrominance signal.

8. A video signal processing system according to claim 1; further comprising time base correcting means having memory means, said memory means having addresses and read and write address control means for selecting addresses of said memory means for writing therein and reading therefrom, said reproduced video signal from said video reproducing apparatus being supplied to said time base correcting means for removing time base errors therefrom before being read therefrom and fed to said means for mixing and said selective means.

9. A video signal processing system according to claim 1; wherein said characteristic includes oddness and evenness of said reproduced television field and said reference television field.

10. A video signal processing system according to claim 9; wherein said at least one type of reproduced television field contains at least a chrominance component having a first phase, said reference synchronizing signal generating means contains means for generating a reference color signal having a second phase and said characteristic further includes said first phase and said second phase.

11. A video signal processing system for processing a reproduced composite NTSC color video signal containing a luminance signal and a chrominance signal and having at least one type of television field containing television lines, said at least one type of television field being one of an odd field or an even field, comprising: reference synchronizing signal generating means for generating a reference synchronizing signal operative to define a plurality of types of reference television fields in a predetermined repeating order, said reference synchronizing signal generating means including means for generating a color subcarrier of the NTSC system; means for separating said luminance signal and said chrominance signal from said reproduced video signal; means for detecting non-coincidence between a characteristic of said at least one type of reproduced television field and one of said plurality of types of reference television fields and for producing a signal in response thereto; means for mixing reproduced video signals of an adjacent two of said television lines to produce an interpolated signal formed of at least one of an interpolated luminance signal and in interpolated chrominance signal, said means for mixing including luminance mixing emans for mixing at least said luminance signal from an adjacent two of said television lines to produce said interpolated luminance signal and chrominance mixing means for mixing said chrominance signal from an adjacent two of said television lines to produce said interpolated chrominance signal; and selective means for selectively producing output video signals containing only one of said reproduced video signal and said interpolated video signal in response to said signal from said means for detecting.

12. A video signal processing system according to claim 11; further including means for detecting a phase condition between said chrominance signal and said color subcarrier and for producing a phase discriminating signal.

13. A video signal processing system according to claim 12; further including chrominance signal inverting means for inverting a polarity of said interpolated chrominance signal in response to both said signal from said means for detecting said non-coincidence and said phase discriminating signal.

14. Video signal reproducing apparatus for reproducing a video signal having odd type and even type television fields each containing television lines and being recorded in slant tracks on a magnetic recording medium, so that successive tracks alternately contain recorded odd type fields and even type fields, the apparatus comprising:
guide drum means on which said recording medium is wrapped for translational motion thereabout at a normal speed in which said odd and even type fields are reproduced to alternate with one another and at an other-than-normal speed in which successive fields of one of said odd and said even type occur in said video signal as reproduced from said recording medium;
at least one rotary magnetic reproducing head on said guide drum means mounted so as to follow said slant tracks when said medium is translationally moved at said normal speed, and to reproduce said video signal recorded therein;
deflection means deflectably mounting said at least one reproducing head on said guide drum means and deflecting said reproducing head so that the latter follows said slant tracks when said medium is translationally moved at said other-than-normal speed; and
means for eliminating perceived vertical vibration in said reproduced video signal, including reference synchronizing signal generating means for generating a reference synchronizing signal operative to define a plurality of types of reference television fields in a predetermined repeating order; means for detecting non-coincidence between a characteristic identifying the type of television field then being reproduced and a characteristic identifying the type of reference television field then being generated and for producing a signal in response to detected non-coincidence of such characteristics; means for mixing reproduced video signals of an adjacent two of said television lines to produce an interpolated video signal representing an average of the video signals of said adjacent two television lines; and means for selecting as an output video signal, in response to said signal from said means for detecting, said interpolated video signal when said non-coincidence is detected and said reproduced video signal when said coincidence is detected.

15. Video signal reproducing apparatus according to claim 14, wherein said recording medium is magnetic tape wrapped helically on said guide drum means, and said at least one magnetic reproducing head rotates in a plane normal to the axis of said drum means.

16. Video signal reproducing apparatus according to claim 14, wherein said deflection means includes a bimorph leaf having a first end on which said magnetic reproducing head is mounted and another end affixed to said guide drum means.

17. Video signal reproducing apparatus according to claim 14; wherein said means for mixing includes a delay circuit having a delay time of one horizontal synchronizing interval for producing a delayed reproduced video signal, and means for adding said delayed reproduced video signal and said reproduced video signal to produce said interpolated signal.

18. Video signal reproducing apparatus according to claim 17; wherein said means for selecting includes switch means for selecting said reproduced video signal and said interpolated video signal.

19. Video signal reproducing apparatus according to claim 14; wherein said reproduced video signal is a composite NTSC color video signal containing a luminance signal and a chrominance signal.

20. Video signal reproducing apparatus according to claim 19; further including means for separating said luminance signal and said chrominance signal from said reproduced video signal.

21. Video signal reproducing apparatus according to claim 10; wherein said means for mixing includes luminance mixing means for mixing at least said luminance signal from an adjacent two of said television lines.

22. Video signal reproducing apparatus according to claim 21; wherein said means for mixing further includes chrominance mixing means for mixing said chrominance signal from an adjacent two of said television lines to produce an interpolated chrominance signal.

23. Video signal reproducing apparatus according to claim 22; wherein said reference synchronizing signal generating means contains means for generating a color subcarrier of the NTSC system.

24. Video signal reproducing apparatus according to claim 23; further including means for detecting a phase condition between said chrominance signal and said color subcarrier and for producing a phase discriminating signal.

25. Video signal reproducing apparatus according to claim 24; further including chrominance signal inverting means for inverting a polarity of said interpolated chrominance signal in response to both said signal from said means for detecting said non-coincidence and said phase discriminating signal.

26. Video signal reproducing apparatus according to claim 14; further comprising time base correcting means having memory means, said memory means having addresses and read and write address control means for selecting addresses of said memory means for writing therein and reading therefrom, said reproduced video signal from said video reproducing apparatus being supplied to said time base correcting means for removing time base errors therefrom before being read therefrom and fed to said means for mixing and said selective means.

27. Video signal reproducing apparatus according to claim 14; wherein said characteristic includes oddness or evenness of said reproduced television field and said reference television field.

28. Video signal reproducing apparatus according to claim 27; wherein said
reproduced television field contains at least a chrominance component having a first phase, said reference synchronizing signal generating means contains means for generating a reference color signal having a second phase, and said characteristics identifying the types of reproduced and reference television fields further include said first phase and said second phase.

* * * * *